United States Patent [19]

Stong

[11] 4,286,691

[45] Sep. 1, 1981

[54] TRUCK LUBRICATOR

[75] Inventor: Jack V. Stong, Swanton, Ohio

[73] Assignee: Seco Manufacturing, Inc., Toledo, Ohio

[21] Appl. No.: 56,511

[22] Filed: Jul. 11, 1979

[51] Int. Cl.³ .......................... F16N 7/14; F16N 13/22
[52] U.S. Cl. ................................. 184/7 CR; 184/6.28
[58] Field of Search ............... 184/7 C, 7 CR, 6, 6.28

[56] References Cited

U.S. PATENT DOCUMENTS

| | | | |
|---|---|---|---|
| 1,889,068 | 11/1932 | Hoss | 184/7 C X |
| 2,278,452 | 4/1942 | Kocher | 184/7 CR |
| 2,725,119 | 11/1955 | Edge et al. | 184/7 C |
| 2,789,664 | 4/1957 | Peterson et al. | 184/7 CR X |
| 2,823,768 | 2/1958 | Taylor | 184/7 C |
| 2,888,098 | 5/1959 | Florence | 184/7 C |
| 2,908,898 | 10/1959 | Mueller et al. | 184/7 C X |
| 3,085,656 | 4/1963 | Thomas | 184/7 C |
| 3,144,096 | 8/1964 | Rotter | 184/7 C |
| 4,147,233 | 4/1979 | Smith | 184/29 |

FOREIGN PATENT DOCUMENTS 385570  3/1965  Switzerland ........................ 184/7 CR Primary Examiner—David H. Brown
Attorney, Agent, or Firm—Millard & Cox

[57] ABSTRACT

Apparatus for periodically delivering liquids or viscous materials at high pressure and in precise amounts to multiple locations is particularly useful in connection with automatically lubricating machinery. The apparatus is formed having a housing and lubricant reservoir within which lubricant is retained substantially at atmospheric pressure levels. Discrete quantities of lubricant are pumped through a plurality of conduits to lubrication sites by a pump assembly which is formed having a piston slidable within an elongate chamber.

17 Claims, 14 Drawing Figures

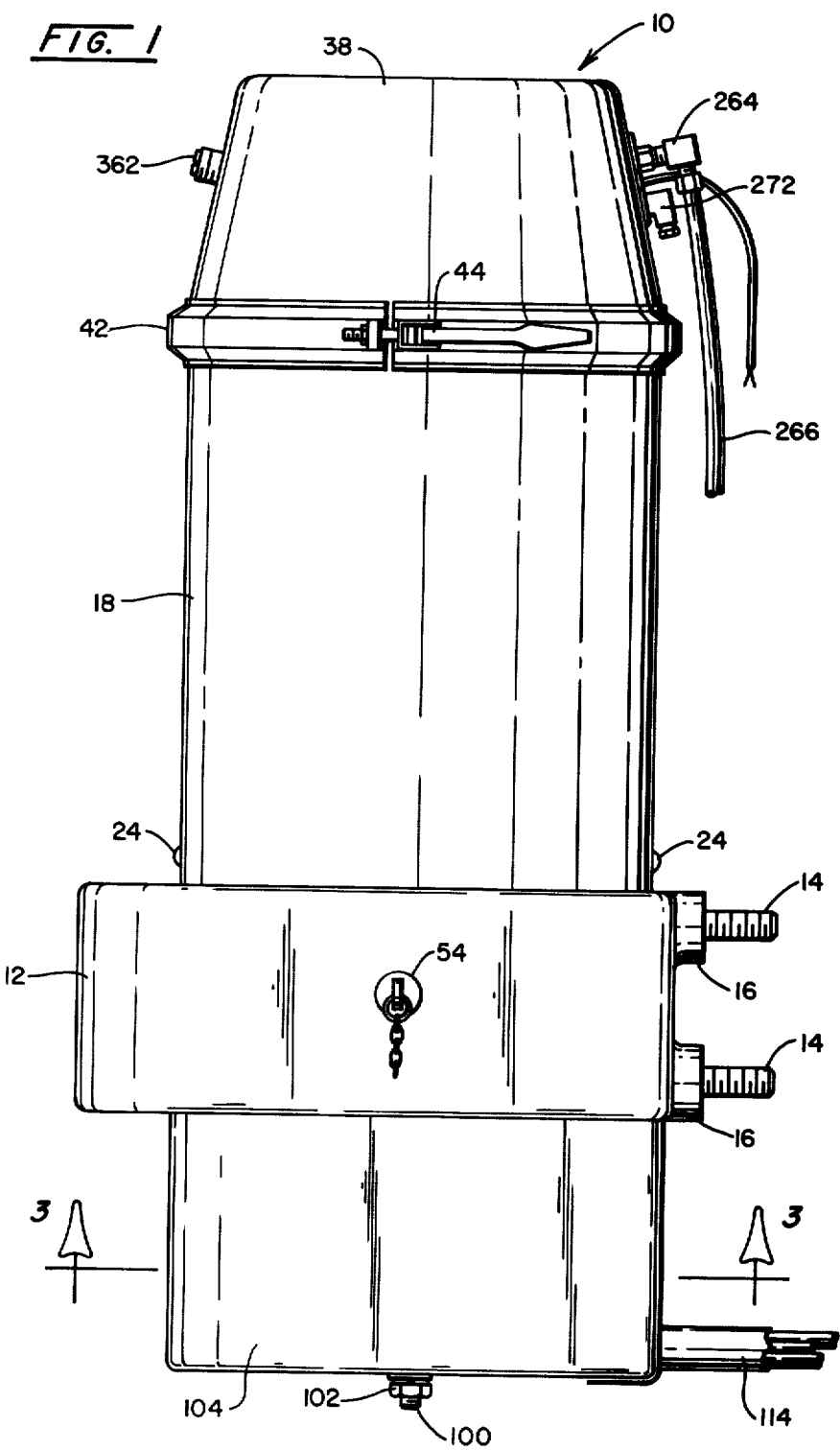

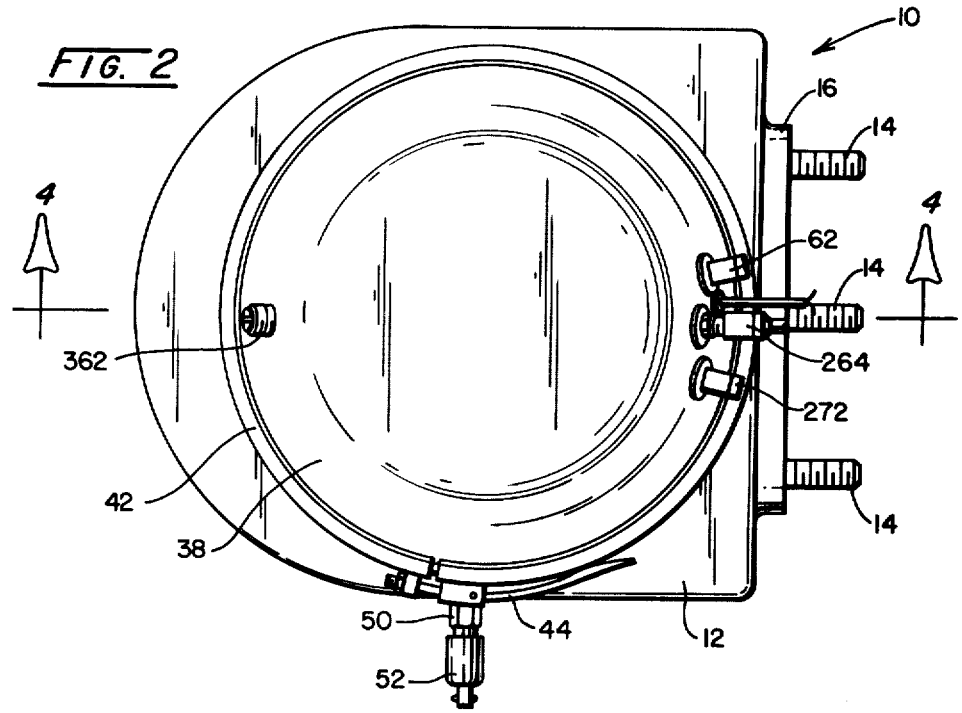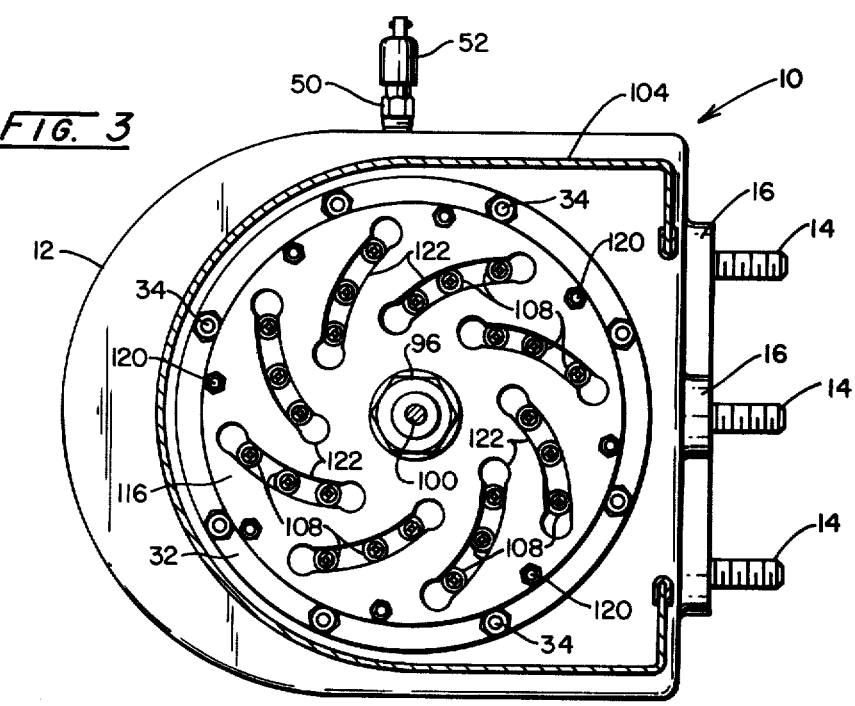

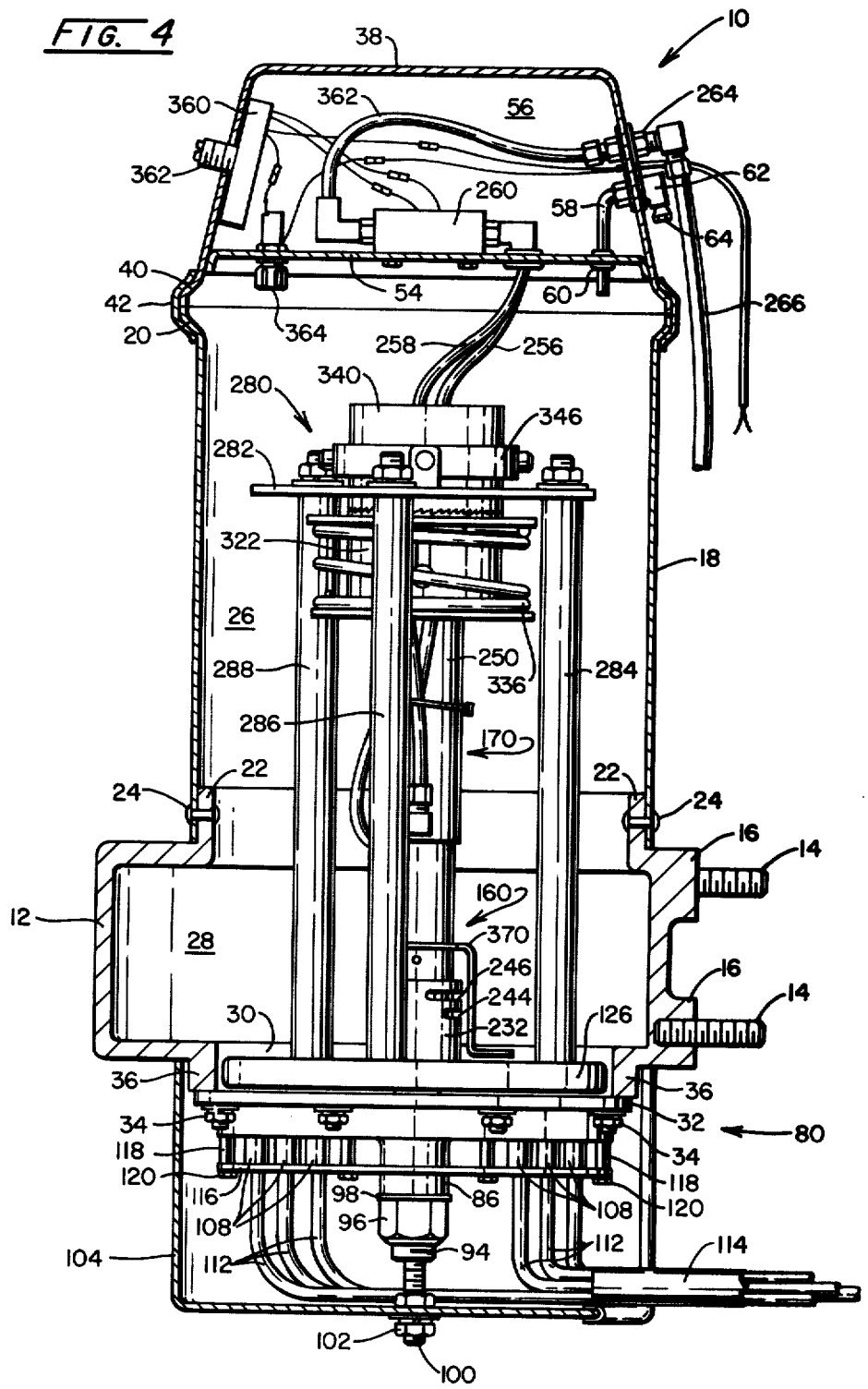

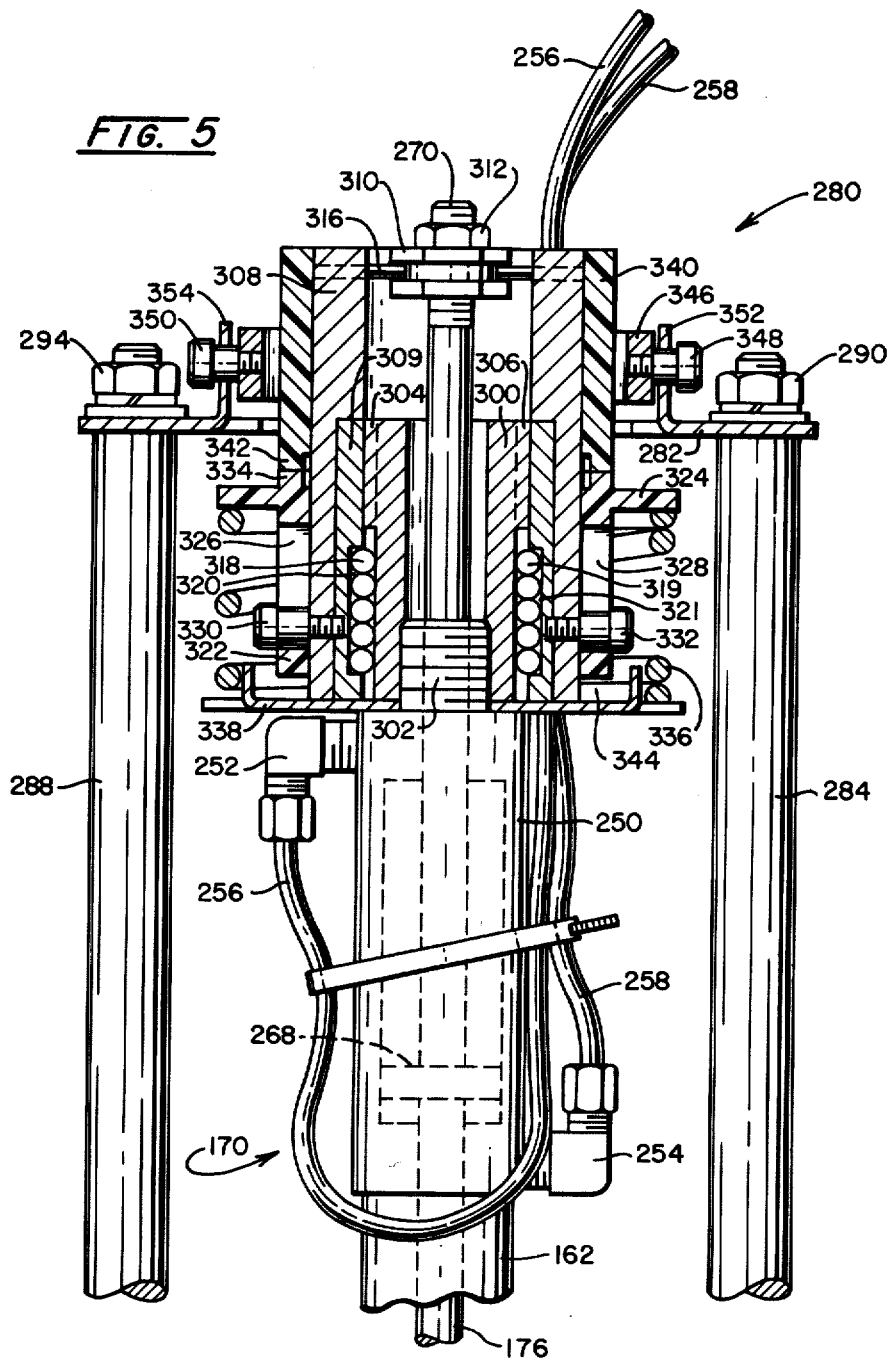

TRUCK LUBRICATOR

BACKGROUND

Heavy machinery, motor vehicles and like major mechanical equipment, for the most part, are manually lubricated at a plurality of critical sites or points in accordance with published schedules of their manufacturer or industrial user. These schedules generally designate the frequency of such lubricative maintenance and the amount of lubricant to be applied as well as the noted sites of application. Where grease is the designated lubricant, a failure to perform scheduled maintenance not only places the operational capability of the machinery in jeopardy due to the frictional association of components, but also permits grease-type lubricants to commence to break down. In the latter regard typical grease-type lubricants comprise admixtures of oil and "soap", for instance an alkali metal such as lithium.

When permitted to remain without replenishment at a lubrication site over an extended interval of time, such lubricants degenerate to lose their lubricating ability and hinder mechanical performance. Due to the vagaries attendant with all scheduled manual maintenance schemes, due regard for the "human element" has prompted industry to look to automated lubrication. When incorporated, for instance, in tractor-trailer rigs, automated lubrication systems promise to extend the operational usefulness of mechanical components with an attendant realization of economy both from the standpoint of extended life spans and in a lowering of maintenance labor costs.

Of course, to remain effective, the automated lubrication system, itself, must be capable of operation under very high standards of reliability. The reservoir from which the lubricant is dispensed should provide for sure delivery of lubricant to dispensing pumps and the like and remain isolated from harsh environments which may be encountered under highway conditions. Additionally, the dispensing pumps should incorporate a capability for dispensing predetermined amounts of lubricants to designated sites or locations. For a given type of equipment, certain groupings of these sites will require a greater quantity of lubricant than others. Further, the machinery and distribution system should exhibit high mechanical reliability over periods of extended performance. This latter requirement necessitates a distribution and pumping mechanism the design of which inherently prohibits binding phenomena and the like.

Where electro-mechanical actuating techniques, for example, arrangements incorporating solenoid drives and the like, are utilized within the systems for purposes of actuating valves utilized, in turn, to control compressed air inputs to components, techniques are required for assuring the reliable performance of such valves themselves. The moving components of these valves should be periodically lubricated to assure their uninterrupted performance.

SUMMARY

The present invention is addressed to apparatus for periodically dispensing lubricant through a plurality of conduits extending to predetermined sites within a mechanism, for instance, a tractor-trailer type vehicle. By automatically dispensing various predetermined quantities of lubricant to critical lubricating sites within the mechanism in accordance with an optimized, time-based program, important improvements in the effective operational lifespan of such equipment may be realized.

The apparatus of the invention incorporates a lubricant reservoir and associated housing within which are located a pump assembly, actuator devices and distributor mechanism. The pump assembly operates in a manner wherein the lubricant reservoir need not be pressurized and all the three principle components are assembled in general symmetry about a central axis of the mechanism.

An important aspect of the invention resides in the provision of a pump assembly which is fixedly mounted within the housing and which incorporates a pump chamber having a piston configuration which reciprocates in one direction to an initial position to cause lubricant to be drawn through an input port into a receiving chamber. To enhance the movement of such lubricant into this chamber, the pump piston assembly is formed having an auxiliary piston through which open channels extend and positioned to move adjacent the input port. The pump is actuated in a manner wherein the piston assembly is driven through a consistently even reciprocating stroke and the amount of lubricant which is expressed through an outlet port for lubricating purposes is regulated through the select positioning of meter ports and valves along the lengthwise extent of the receiving chamber. These valves serve to remove lubricant from within the receiving chamber for return to the reservoir in accordance with the position of a meter valve control component. This component operates in conjunction with the location of the distributor function of the assembly. Preferably, the distributor is one which utilizes a rotating distributor-selector member through which metered amounts of lubricant are expressed and which indexibly rotates to deliver such lubricant to select conduits attached to the apparatus.

As another object and feature of the invention, the distributor-selector component of the apparatus is indexibly driven by a mechanism including a drive assembly coupled in driven relationship with the piston of an air cylinder and which serves to derive a reciprocative drive output rotating to a predetermined extent in one direction, following which it rotates an equivalent extent in an opposite direction in response to an oppositely directed drive input thereto. A jaw clutch assembly is coupled in driven relationship with this drive assembly and incorporates a driven clutch component which is rotationally, incrementally and unidirectionally movable a predetermined extent only in response to the drive assembly output movement in one rotational direction. Transfer of this rotational drive to the distributor-selector component of the apparatus is provided utilizing a pivotal arrangement of components and parts serving to avoid a binding of parts occasioned through misalignments.

A particular advantage accruing through the utilization of the drive assembly resides in the elimination of a ratchet form of drive in which individual ratchet teeth are called upon to carry an entire rotative indexing load. With the present invention, the rotational force and movement asserted is one developed utilizing a cylindrically shaped clutch driver guide in combination with a clutch driver, the interface between which components is provided having a helix shaped raceway along with ball bearings. With this arrangement, actuation of the clutch driver causes it to move under relatively low friction bearing guidance to develope a necessary rotative output. This same rotative output is imparted to the teeth of a jaw clutch assembly only when all such teeth are intermeshed. As a consequence, the tooth structure of the clutch mechanism is not overstressed and provides troublefree and reliable perfomance.

A further object of the invention is to provide a pump apparatus for dispensing predetermined quantities of liquids of widely varying viscosities. This pump arrangement includes a cylinder having walls which are configured to define an elongate pump chamber within which a pump piston is actuable to slide reciprocally. The piston includes a metering edge which moves during such actuation between a first and second position along a path spaced a predetermined distance from an inport of the pump cylinder. This path defines a receiving chamber within the pump when the metering edge has been driven to its first position. The pump apparatus provides for variation in the amount of liquid dispensed from its output port through the utilization of meter ports communicating between the receiving chamber and the liquid supply and which are positioned a predetermined distance along the aforesaid path of movement from the first position. A valve is positioned over each metering port to provide a section of amounts of liquid dispensed depending upon a control input. An output check valve communicates with an output port outwardly of the defined receiving chamber of the pump for carrying out the dispensing of liquid. Where highly viscous liquids are pumped such as grease, the pump piston is configured having an auxiliary piston slidable within the pump chamber and coupled with the principal pump piston. This auxiliary piston incorporates chanels extending therethrough for conveying the liquid toward the receiving chamber when the pump piston moves in a pumping direction toward the aforesaid second position and at such as the meter valves are open and not passed by the metering edge of the principal pump piston. In the event the meter ports are closed, liquid does not move through these channels and is expressed through the output port of the pump.

Other objects of the invention will, in part, be obvious and will, in part, appear hereinafter.

The invention, accordingly, comprises the apparatus possessing the construction, combination of elements and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 1 is a side elevational view of lubricating apparatus according to the invention;

FIG. 2 is a top view of the lubricating apparatus of FIG. 1;

FIG. 3 is a bottom view of the lubricating apparatus of FIG. 1 taken through the plane 3—3 shown therein;

FIG. 4 is a sectional view of the lubricating apparatus of FIG. 1 taken through the plane 4—4 as shown in FIG. 2;

FIG. 5 is a partial sectional view of a portion of the actuator assembly of the lubricating apparatus of FIG. 1;

DETAILED DESCRIPTION

Figure 3A:
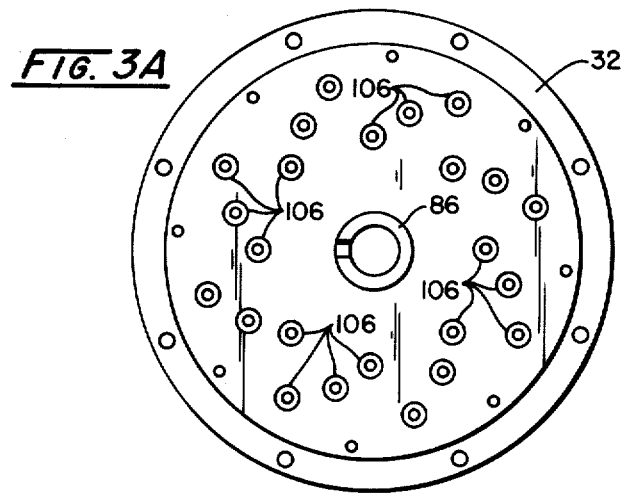
FIG. 3A is a bottom view of a distributor component of the apparatus shown in FIG. 3.

The lubricating apparatus of the instant invention is one which uniquely periodically dispenses lubricant, for instance, to lubrication sites within a typical tractor-trailer, from a central lubricant containing reservoir. However, this reservoir is not retained under pressure, the lubricant being pressurized in the course of its exit from the reservoir, whereupon it is dispensed through select ones of thin, flexible conduits to various lubricating sites. Looking to FIG. 1, this reservoir arrangement and the accounted dispensing apparatus is revealed generally at 10. Apparatus 10 includes a principal housing portion 12, which, for example, may be cast from aluminum or other suitable material appropriate for the rigorous environments encountered in highway travel. Housing portion 12 is attached at a convenient location upon the vehicle which it periodically lubricates by connection therewith through threaded studs 14 fixed within and extending from corresponding boss component 16 of housing portion 12. Standing upon and extending upwardly from housing portion 12 is a tubular shaped reservoir wall 18. Wall 18 is cylindrical in shape and fashioned of rigid material, extending upwardly to an outwardly disposed flare or flange 20 as shown in FIG. 4. That figure additionally reveals that the lower portion of wall 18 is attached to an upstanding integrally formed annular flange portion 22 of housing portion 12 by suitable connectors such as rivets 24.

FIG. 4 further reveals that the lubricant retaining reservoir region denoted generally at 26 of the apparatus 10 extends through an annular opening defined by flange portion 22 and into the hollow interior of housing portion 12 as represented at 28. A circular shaped lower disposed opening 30 within reservoir portion 28 is closed by a base member or distributor plate 32 attached by bolts and threaded studs as at 34 through gasket 35 to the downwardly depending flange component 36 of housing portion 12.

As is additionally shown in FIG. 4, reservoir wall 18 is capped by a cover assembly 38 present as a cup-shaped stamping having outwardly flared and downwardly depending edge portion 40 which is configured to match the corresponding flare 20 of wall 18 and are attached thereto by a strap 42. FIGS. 1 and 2 reveal strap 42 to be of general channel shaped configuration and retained in tension about joined flare portions 20 and 40 by an over-center clasp 44. These figures further reveal the presence of a conventional double valve quick-disconnect fitting 50 along with cap 52 as extending through housing portion 12 and into cavity 26. With the presence of fitting 50, as the vehicle on which the apparatus 10 is moved into a service area, the attendant need only attach a conventional grease or lubricant dispensing device to fitting 50 to carry out reservoir filling operations.

Returning to FIG. 4, it may be observed that the upper portion of cap 38 is enclosed by a mounting plate 54 attached thereto by suitable connectors such as bolts or the like (not shown) to define another enclosed cavity 56. As is described in detail later herein, cavity 56 retains a variety of control implements. However, additionally incorporated within cavity 56 is an air vent tube 58 which extends through a seal 60 to the uppermost region of reservoir 26. Tube 58 extends in the opposite direction through an elbow fitting 62. The input to elbow 62 at screen element 64 is downwardly directed to avoid the entrance therethrough of rain or the like. With the venting arrangement thus described, the lubricant within regions 26 and 28 is permitted to flow downwardly in a manner unaffected by lower pressures which otherwise might be developed in the course of lubricant utilization. This venting also facilitates the filling operation through fitting 50 by preventing back pressures within the reservoir environment.

Figure 12:
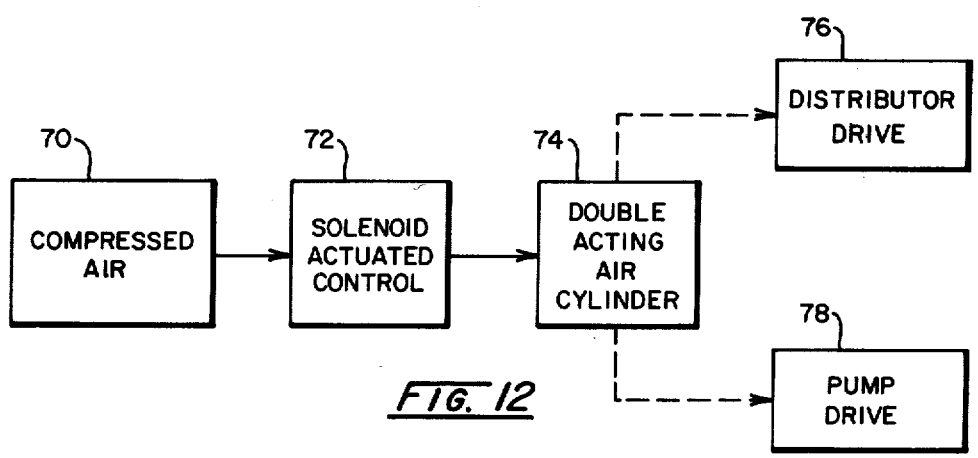
FIG. 12 is a block schematic diagram of the actuation control utilized with the apparatus of FIG. 1.

Turning now to the dispensing operation of the apparatus 12, reference initially is made to FIG. 12 wherein a general schematic representation of the control and compressed gas drive arrangement is revealed. A source of compressed gas, i.e. air, as is conventionally available for tractor-trailer installations and the like is utilized as a drive source. This source is represented in the figure at block 70. Gas under pressure is delivered from source 70 to a solenoid actuated control valve revealed at block 72. Controlled air or gas under pressure is selectively delivered to a double acting air cylinder represented by block 74 which is actuated in correspondence therewith to alternately power a distributor drive represented at block 76 and a pump drive represented at block 78. The alternate power supplied to functions 76 and 78 obtains from the reciprocating action developed from the double acting air cylinder represented at block 74.

Looking to FIG. 4, the components retained within reservoir portions 26 and 28 are shown to be somewhat vertically associated to define a structure which is symmetrically disposed about a central axis within apparatus 10. In effect, a form of axle extends upwardly through apparatus 10 from its attachment at housing portion 12 and base member 32 and certain of the components of the device rotate about this axle defining association of components. Member 32 forms one component of a distributor function represented generally at 80 and which is described in greater detail in an application for U.S. patent, Ser. No. 714,622 entitled "Chassis Lubricator" by R. B. Smith, filed Aug. 16, 1976, now U.S. Pat. No. 4,147,233.

Figure 8:
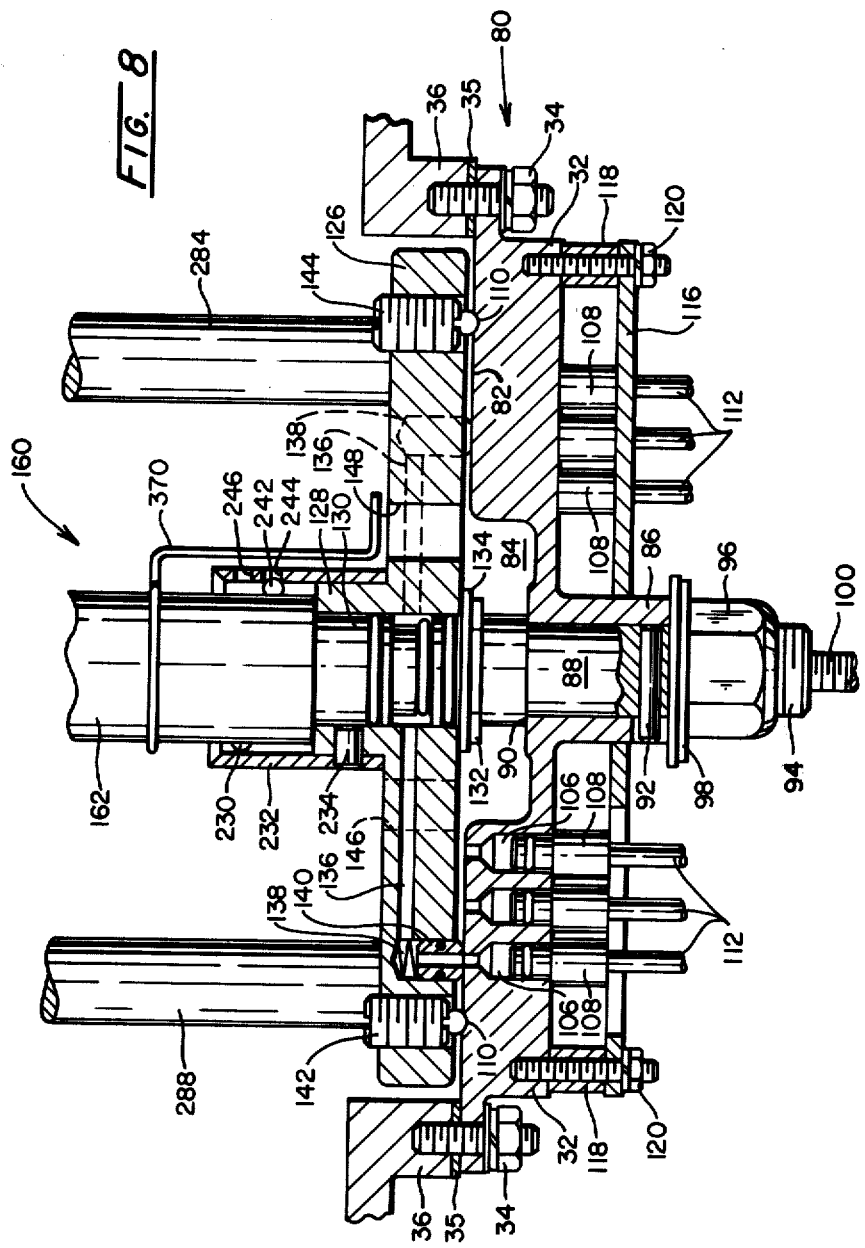
FIG. 8 is a partial sectional view of a distributor arrangement utilized in conjunction with the lubricating apparatus of FIG. 1.

Looking additionally to FIGS. 8 and 3A, base member 32 is shown to be configured having a substantially flat and smooth upward surface 82 which extends from the outer periphery thereof to a centrally disposed lubricant receiving cavity 84 of generally circular cross section. At the centermost portion of member 32 there is integrally formed a downwardly depending cylindrical extension 86. Extension 86 is centrally bored to receive the lower supporting portion 88 of a component which serves, inter alia, as an axle-type structure as well as to carry out lubricant distribution and pumping functions. Component portion 88 is necked down to define a collar at 90 which nests against the corresponding lower surface of cavity 84 and is restrained from rotation within extension 86 by virtue of a bore formed therethrough as well as through extension 86 and into which a roll pin 92 is inserted. The component additionally is threaded along its lowermost extent 94 so as to receive a retainer nut 96. Nut 96 is tightened against the lowermost face of extension 86 and washers as at 98 are interposed at this connection. The downward surface of extension 94 is centrally counterbored and tapped to receive a threaded stud 100 which, as shown in FIGS. 1 and 4, in turn, receives a nut and washer assemblage 102 serving to retain a lower cover 104 in place against the lowermost surface of housing portion 12.

FIGS. 3, 3A and 8 reveal that distributor member 32 is configured incorporating a plurality of inlet ports certain of which are shown at 106 and which are disposed predetermined radial distances from the axial center of the member. These inlet ports extend to upper surface 82 and are enlarged to receive press-in type fittings 108. Such fittings are, for example, marketed by Colder Products, Inc., Minneapolis, Minn., as model A 105-00. The number of these inlet ports and associated fittings depends upon the number of lubrication sites intended to be serviced by apparatus 10. FIG. 3 reveals an orientation wherein 24 inlet ports and associated fittings are provided within distributor-base member 32. With such an arrangement, a regular spacing of the inlet ports will center them at 15° increments about the central axis of member 32. Optionally, distributor plates having 36 or 48 inlet ports may be utilized. Note, that each of these inlet ports 106 is discretely positioned with respect to a corresponding discrete and unique radius extended from the noted central axis. Radially associated with each of the inlet ports 106 is a hemispherically shaped detent or indentation 110, each such indentation being positioned outwardly of the inlet ports 106. Two of these indentations are revealed in FIG. 8. That figure also reveals that the tube fittings 108 each are coupled with a tube or conduit 112 which are grouped as a harness 114 as shown in FIGS. 1 and 4. From this harness, tubes 112 lead to lubrication sites within the machinery or truck chasses upon which apparatus 10 is mounted. Fittings 108 each contain a ball check valve for eliminating the effects otherwise encountered from back pressures developed within tubes 112 in the course of operation of apparatus 10. To retain tube fittings 108 within their appropriate inlet ports 106, a retainer plate 116 is attached to member 32 by threaded stud and nut assemblies 120 extending through spacers 118. FIG. 3 reveals an arrangement of slots 122 within plate 116 and having narrow centrally disposed portions which serve to nest against fitting 108 to retain them in appropriate position. These slots are enlarged at their termini for purposes of inserting the fittings and are so arranged as to be universally utilized for expanded numbers of inlet ports. The particular interconnection between tubes or conduits 112 and the lubrication sites upon the truck chasses being lubricated is not shown, it being within the purview of those skilled in the art to provide an appropriate interconnection.

Figure 9:
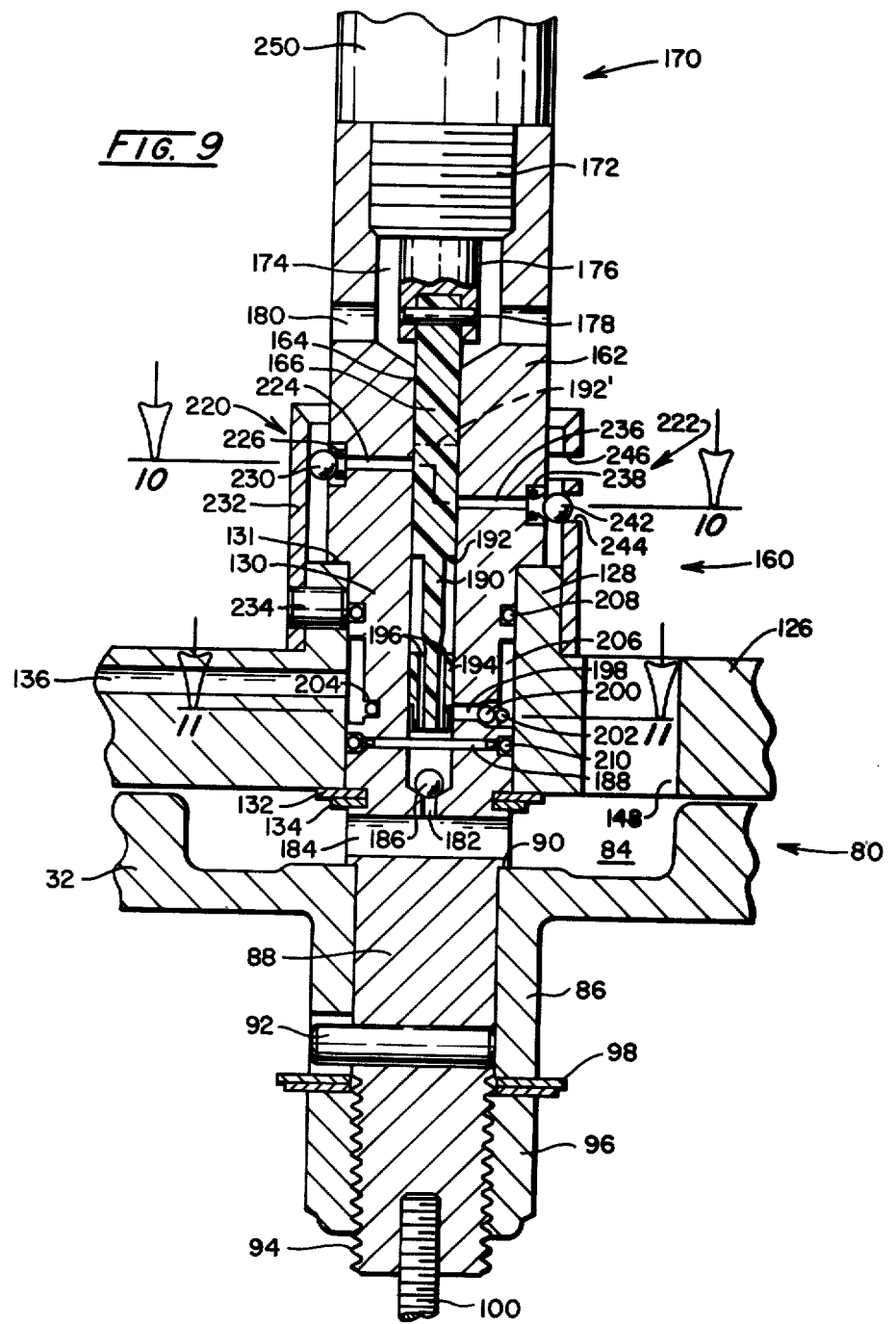
FIG. 9 is an enlarged sectional view of portions of the pumping and distribution components of the lubricating apparatus of FIG. 1.

FIGS. 8 and 9 reveal a distribution-selector or rotor member 126. This member is of circular peripheral configuration, having an upstanding annular extension 128 integrally formed and symmetrical about the central axis thereof. Member 126 is centrally bored through extension 128 such that it is slidably received by an upwardly disposed portion 130 of component 88 which will be seen to serve as an axle having a lubricant dispensing task in connection with a lubricant pumping function. Member 126 is retained in appropriate vertical position by a retainer ring 132 and spacer washer 134. Thus mounted, member 126 is permitted to indexably rotate about axle portion 130 and the lower surface thereof moves in close adjacency over the upwardly disposed surface 82 of base member 32. Member 126 is formed having three radial bores, two of which are revealed at 136 in FIG. 8, which are mutually displaced from one another at angles of approximately 120 degrees and each of which extends to a corresponding transversely disposed bore 138, two of which are shown in FIG. 8. Within each of these bores 138 is disposed a plastic insert as at 140 each of which is centrally bored. These inserts 140 additionally are formed having a somewhat centrally disposed groove over each of which is positioned an O-ring. Additionally, the inserts are configured to extend slightly below the lower surface of member 126. Note additionally, that the upward extent of the inserts 140 is limited to provide a lubricant conveying communication of their centrally disposed bores with the corresponding associated radial bore 136. Preferably, inserts 140 are fashioned of a plastic which is immune from reaction from typical lubricants such as grease. Accordingly, the inserts may be formed, for example, of nylon.

Radial bores 136 are positioned within member 126 such that they receive pumped lubricant from the pumping function of apparatus 10. The central bores of inserts 140 and the transverse bores 138 within which inserts 140 are positioned are so radially located from the central of member 126 as to selectively alignable with predetermined ones of the inlet ports 106 positioned within member 32. Recall from the description of FIGS. 3 and 3A that these inlet ports are each positioned upon a unique radius of member 32. Accordingly, as distributor-selector member 126 is rotated or indexed from one pumping position to a next, the central bores of inserts 140 will be in lubricant conveying alignment with predetermined input ports. Upon being pumped through in the central bores of inserts 140 and into inlet ports 106, the lubricant passes the check valves within inserts 108 for delivery into an appropriate corresponding conduit or tube 112. The alignment of the distributor-selector member 126 requisite to provide the noted distribution of lubricant is assured by virtue of a detent arrangement including oppositely spaced bores which threadably receive detent assemblies 142 and 144. Assemblies 142 and 144 include a spring biased ball shaped detent member which slides along the upper surface 82 of member 32 until encountering a hemispherical detent indentation 110. The oppositely disposed spacing of detent assemblies 142 and 144 along a diameter of member 126 assures an aligned and nonbinding rotation of the member. In the same regard, the approximately 120° spacing of radial bores 136 assures a uniform assertion of lubricant derived pressure through the central bores of inserts 140. Such an arrangement enhances the trouble-free, long-term performance of apparatus 10.

Distributor-selector member 126 additionally incorporates three identically structured luburicant inlet openings, two of which are revealed at 146 and 148 in FIG. 8. These openings, may, for example, by symmetrically disposed along center lines spaced at approximately 120° intervals and provide an access route for lubricant within reservoir 28 to move into cavity 84. It has been found through this arrangement that, as distributor-selector member 126 rotates, a shear phenomena occurs within grease type lubricants in the vicinity of openings 146 and 148 which tends to promote the movement thereof toward cavity 84. This promoted lubricant transmission is due, in part, to the thixotropic nature of grease lubricants.

Distributor function 80 operates in association with a pumping function shown generally at region 160 in the drawings. Looking to FIG. 9, function 160 is illustrated as being formed above axle portion 130 and includes an integrally formed cylindrically shaped portion 162 of slightly larger widthwise diameter. Portions 130 and 162 are centrally bored at 164 to define a pump chamber within which a pump piston configuration 166 is slidably movable.

Reciprocal movement of piston configuration 166 is provided from an actuator function represented generally at 170 which is present as a double acting, double end rod, air return air cylinder having a double end mount. One such mount for the air cylinder is provided as a threaded stud extension 172 which is threadably attached to a correspondingly tapped counter bore 174 formed within pump portion 162. A drive stem 176 of this air cylinder is reciprocally movable within the lower level of bore 174 and is connected to the uppermost end of piston configuration 166 by pin connection 178. Bore 174 is vented by a transversely oriented bore 180 which communicates with the grease or other lubricant within reservoir portion 28.

The inlet port for the pump assembly at 160 is provided by the association of a relatively small bore 182 positioned at the lowermost extent of central bore 164 and a transversely oriented bore 184. Bore 184 communicates with cavity 84. Thus, lubricant passes through channels as at 146 and 148 into cavity 84, thence through bore 184 and into smaller bore 182. A check valve is provided for the inlet port by virtue of the positioning of a valve ball 186 at the lower terminus of central bore 164. Ball 186 is restrained against excessive vertical movement by a pin 188 extending transversely across bore 164 and through the pump cylinder wall 130.

Piston configuration 166 includes a principal body or piston portion which extends from pin connection 178 to a cylindrical, necked down portion 190, the upward terminus of which defines a metering edge 192. An open cavity is established between necked down portion 190 and the adjacent surface of bore 164. The lower terminus of portion 190 is integrally coupled with an auxiliary piston 194. Auxiliary piston 194 includes two lubricant transmitting channels 196 extending longitudinally therethrough and its upper portion is provided having a diameter corresponding with the principal piston portion below which that diameter is slightly lessened. The diameter of each channel 196 is relatively small, being in the range of 0.017 inch for typical grease lubricant pumping applications. As is apparent, piston configuration 166 may be fabricated as a unitary component utilizing any of a variety of materials. However, Delrin has been found to be preferred for this purpose.

Figure 11:
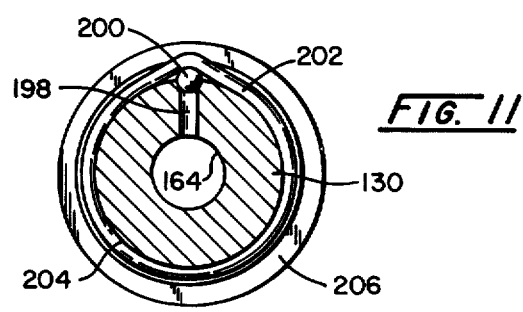
FIG. 11 is a sectional view of the pumping assembly of FIG. 9 taken through the plane 11—11 identified therein.

An output or dispensing port is provided for the pump assembly at a location just above pin 188 of the input check valve. Looking additionally to FIG. 11, the output port is shown to be formed as a transverse bore 198 which extends from bore 164 to an output valve. This output valve is formed incorporating a ball 200 seated within a counterbore and retained in position by a flexible O-ring 202. O-ring 202, in turn, rests within a relatively narrow groove 204 which, in turn, is formed within a relatively wide groove 206. The depth of groove 206 is selected such that O-ring 202 is permitting to extend over ball 200 and remain within the confines of the outer cylindrical periphery of pump portion 130. The output port and its associated output valve structure is regionally sealed by spaced O-rings 208 and 210 positioned with corresponding grooves in the surface of axle-type pump portion 130. Thus configured, pumping action by piston configuration 166 as it moves in a downward direction forces lubricant through bore 198 and around valve ball 202, thence through wide groove 206 to enter channels 136. These latter channels are positioned so as to intercept wide groove 206 for any given rotationally derived orientation which they assume.

The stroke imparted to piston configuration 166 is consistent in length for all acutations thereof by the air cylinder drive stem 176. In this regard, at the termination of an upward stroke, metering edge 192 moves to the position represented by dotted line 192'. As the metering edge 192 reaches the initial position 192', a receiving chamber is defined extending from that edge to the input valve, that chamber thus being filled with lubricant through bores 184 and 182. During this upward movement, auxiliary piston 194 enhances the suction of the pump, lubricant not being transmitted through channels 196 in consequence of the vacuum established within the upper regions of the pump structure. As is apparent, upon a return stroke, ball 186 seats against bore 182 to close the input valve, while ball 200 of the output valve is driven outwardly by lubricant under pressure at an appropriate point in time to cause the expression of lubricant through bore 198, into wide groove 206, thence into radial bores 138.

Figure 10:
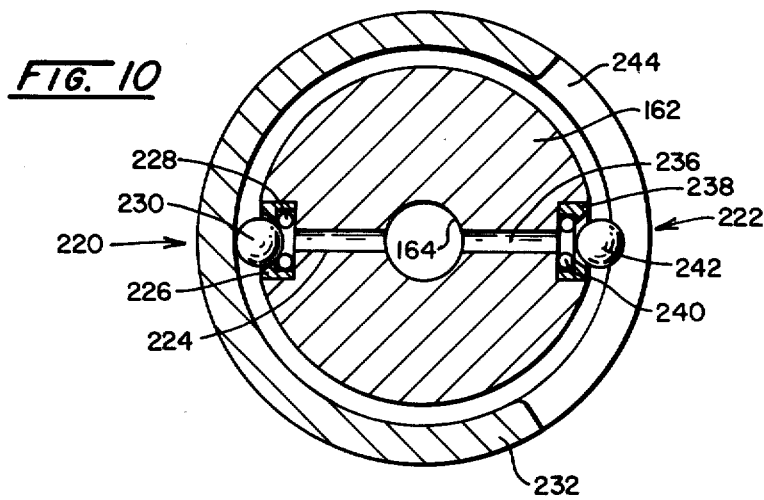
FIG. 10 is a sectional view taken through the Section 10—10 of FIG. 9.

The amount of lubricant which may be expressed through the output port of the pump assembly may be metered for select orientations of distributor-selector 126 notwithstanding the presence of a constant length piston stroke. To provide this feature, one or more metering valve assemblies are incorporated within pump cylinder portion 162. FIGS. 9 and 10 reveal two of these metering valve assemblies at 200 and 222. It may be observed that valve assembly 220 is positioned in closer proximity to the position 192' of maximum upward travel metering edge 192. Assembly 220 includes a transverse bore 224 extending from central bore 164 to reservoir region 28. The bore 224 is counterbored at the outward surface of pump portion 162 to receive a seal retainer 226 functioning to hold a small O-ring 228 in a sealing orientation with respect to a ball member 230. Note, that an outward point on the surface of ball 230 is in contact with the cylindrical inward surface of a control member present as a slotted sleeve 232. This inward surface of sleeve 232 is illustrated as urging ball 230 into contact with O-ring 228 to close the passageway defined by bore 224. FIGS. 8 and 9 reveal that sleeve 232 is journaled over and positioned in close fitting adjacency with flange component 128 extending outwardly from distributor-selector member 126. Sleeve 232 is rotated with distributor-selector 126 in consequence of its pinned connection thereto by roll pin 234.

FIGS. 9 and 10 reveal that lower disposed meter valve assembly 222 is identically structured to assembly 220 and is illustrated in an open orientation. Note, that the assembly includes a transverse bore 236 communicating between reservoir 28 and central bore 164 which is counter bored to receive a seal retainer 238 which, in turn, functions to retain a small O-ring 240 in proper position for functioning with a ball member 242. Meter valve assembly 222 is in an open orientation, ball member 242 being located outwardly from contact with O-ring 240 in consequence of the positioning of a slot 244 within sleeve 232 thereover. Slot 244, as well as an upwardly disposed slot 246 are formed within sleeve 232 in a manner wherein they selectively intercept respective ball members 230 and 242. Upon such interception, the ball members are permitted to move slightly outwardly, thus defining an open valve configuration. Inasmuch as sleeve 232 rotates in connection with distributor-selector 126, valve assemblies 220 and 222 may be programmed to open and close in correspondence with the positions of inserts 140 of member 126. Inasmuch as certain components, for example, of a truck chassis require less lubricant than others, such programming permits a simple accommodation for this requirement. The metering arrangement operates such that, as metering edge 192 moves downwardly from its initial position at 192', grease or lubricant is expressed through whichever of meter valve assemblies 220 and 222 is open and into reservoir 28. While any such meter valve is open, no grease or lubricant is dispensed through bore 198 of the output port, that grease or lubricant in the lower region of the receiving chamber passing through channels 196, thence upwardly and through the open meter valve or valves. Once metering edge 192 passes the lowest open meter valve port as at 224 or 236, the amount of lubricant within the reservoir below that point is expressed through port 198, inasmuch as no pressure release is available above it. As is apparent, a greater or lesser number of meter valve assemblies may be incorporated within the elongate pump structure to accommodate for a wide variety of lubrication quantity requirements. Upon an upward return stroke of pump piston assembly 166, meter valve assemblies 220 and 222 are closed in conventional check valve fashion.

As indicated earlier herein, apparatus 10 is formed having a somewhat axial, centrally arranged sequence of pumping and distribution cmponents, the actuator function being revealed generally at 170 which is threadably coupled to pumping function 160 through threaded stud extension 172 (FIG. 9). This actuator assembly may be one readily available in the marketplace. For example, that shown at 170 may be an air cylinder of the double acting, double end rod, air return-double end mount type available from Bimba Manufacturing Co., Monee, Ill. as Series 609DDE, Part No. D-15-747-A. This air cylinder is shown at 250 in FIG. 5 as having two spaced compressed air feed inputs at couplings 252 and 254 to which are connected conventional, flexible input tubes or hoses shown, respectively, at 256 and 258. As shown in FIG. 4, these tubes 256 and 258 extend through seals within mounting plate 54 to the control ports of a solenoid actuated control valve 260. Valve 260 in turn, is coupled to receive compressed air from an input tube 262 and associated fitting which extends through cover assembly 38 at appropriate connectors 264. Connectors 264, in turn, are coupled to receive compressed air from an air line 266 extending from the compressed air supply of a truck or similar mechanism. Solenoid control valves as at 260 are readily available to industry, being marketed, for example, by Mead Corporation, Chicago, Ill., as model LTV-115. The relatively low pressure fittings utilized in conjuction with valve 260 may, for example, by those marketed by Legris, Inc., Rochester, N.Y. as LF 3000 instant fittings.

Returning to FIG. 5, air cylinder 250 operates in conventional fashion, certain of its basic components being represented in the drawing in schematic, dashed line fashion to facilitate an understanding of the components with which it is associated. In typical fashion, the cylinder 250 includes a piston assembly 268 which may be driven reciprocally between oppositely disposed limiting positions. Two drive stems extend from piston assembly 268, one having been described earlier at 176 while an oppositely disposed stem is represented at 270. In operation, compressed air is selectively introduced through fittings 252 and 254 to alternately drive and exhaust the piston chamber on either side of piston assembly 268, thus provides a positive drive for both directions of its movement. The resultant reciprocal movement is translated to associated driven mechanisms through stems 176 and 270. Exhausting of the cylinder is additionally carried out from fittings 252 and 254 as controlled through solenoid control valve 260.

The actuator arrangement of the apparatus 10 further includes a mechanism revealed generally at 280 in FIGS. 4 and 5, which functions to drive distributor-selector member 126 in rotary fashion and in incremental steps from one lubricating position to the next. In general, mechanism 280 is actuated from air cylinder 250 to indexibly rotate about the centrally disposed axis of apparatus 10. In so doing, the mechanism drives a plate member 282 to which is attached a drive transfer arrangement comprising three downwardly extending drive studs 284, 286 and 288. As shown in FIG. 6, drive studs 284, 286 and 288 are connected to plate member 282 by respective bolt assemblies 290, 292 and 294. These connections are rigid and provide for a transfer of rotative motion to distributor-selector member 126. In the latter regard, the lowermost extent of each drive stud 284, 286 and 288 is threaded for insertion within corresponding tapped bores formed within distributor-selector member 126.

Figure 6:
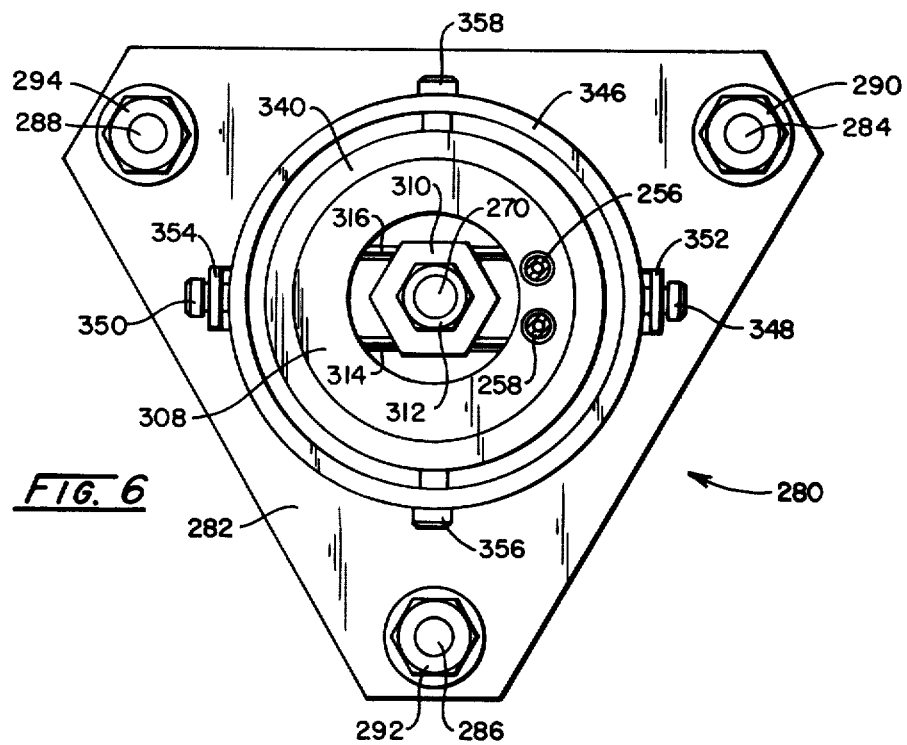
FIG. 6 is a top view of the actuator apparatus of FIG. 5.
Figure 7:
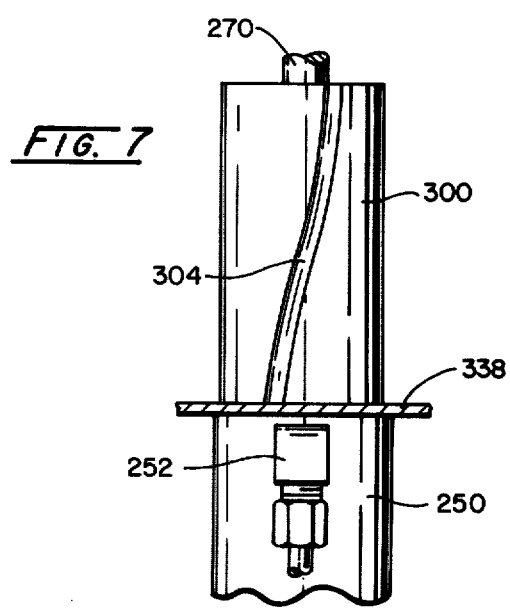
FIG. 7 is a fragmentary view of a component of the actuator assembly shown in FIG. 5.

Returning to FIG. 5, the drive assembly arrangement for mechanism 280 is shown to include a cylindrically shaped clutch driver guide 300 having a cylindrically shaped opening extending therethrough and which is tapped to provide for its connection with an upstanding threaded stud 302 extending from and fixed to air cylinder 250. Drive stem 270 of air cylinder 250 extends upwardly through stud 302 and is supported for reciprocal movement both by the stud and the internal structure of cylinder 250. The outer cylindrical surface of clutch driver guide 300 incorporates two oppositely spaced curvilinear (helix) shaped raceways 304 and 306, the former being revealed in FIG. 7. Slidably disposed over the outer surface of clutch driver guide 300 is a cylindrically shaped clutch driver assembly 308 the interior of which retains a cylindrical insert 309. Assembly 308 is coupled to be reciprocally driven by stem 270 of air cylinder 250 by connection therewith through an assembly including a drive nut 310 attached to the threaded end portion of stem 270 and retained in place by a locking nut 312. Drive nut 310 is configured having a centrally disposed channel which, as is revealed in FIG. 6, rides upon two spaced parallel roll pins 314 and 316 which extend into driver assembly 308. Accordingly, with the reciprocal movement of stem 270, clutch driver assembly 308 is moved in vertical correspondence. However, a reciprocal twisting or rotational movement also is imparted to guide 308 by virtue of its connection with clutch driver guide 300 through ball bearings as at 318 and 319 retained within respective notches as at 320 and 321 formed within insert 309 and movably associated with helix shaped raceways 304 and 306. The extent of rotation of driver assembly 308 is determined by the degree of curvature of raceways 304 and 306 which, in turn, is determined with respect to the extent of rotational movement required for distributor-selector member 126 to index from one lubricating input port to the next.

Figure 5A:
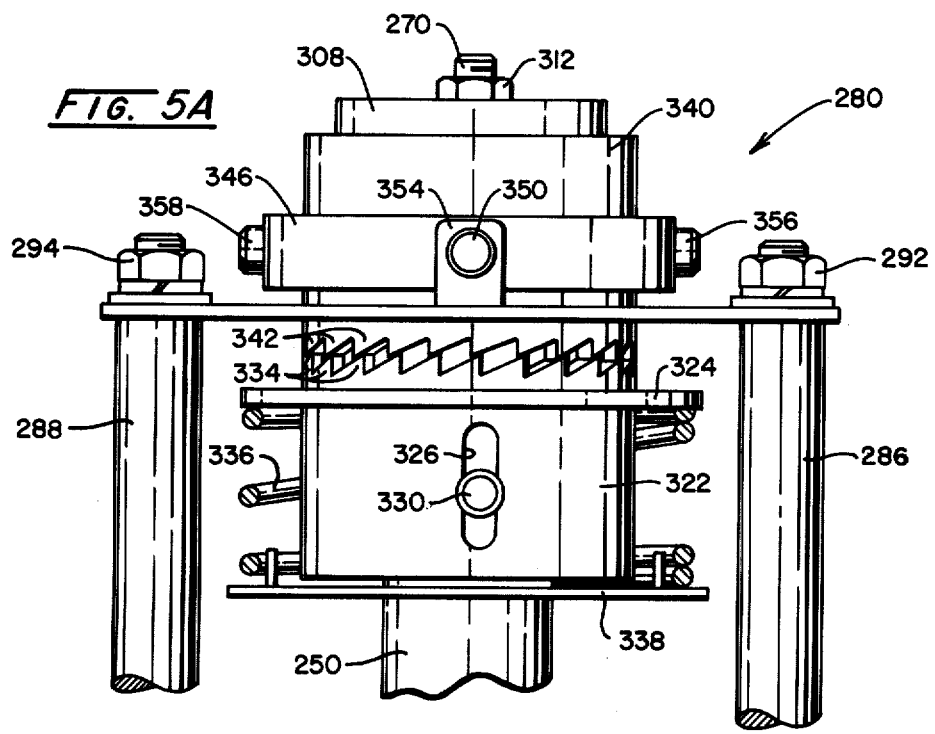
FIG. 5A is a partial view of the apparatus of FIG. 4, showing a mid-actuation cycle of the apparatus shown in FIG. 5.

Looking additionally to FIG. 5A, the reciprocal, rotational drive exhibited by clutch driver assembly 306 is imparted to a lower, cylindrically shaped drive clutch 322. Fabricated from Delrin or the like, clutch 322 is formed having a central opening which slidably engages the outer surface of driver assembly 308 and includes an outwardly disposed cylindrically shaped flange 324 as well as two oppositely disposed and vertically aligned elongate slots 326 and 328. Extending into slots 326 and 328 are respective shoulder screws 330 and 322 which are threadably connected within tapped bores extending into clutch driver assembly 308 and insert 309 and which incorporate cam surfaces in driving contact against the surfaces of corresponding slots 326 and 328. With the arrangement shown, as clutch driver assembly 306 is elevated by drive stem 270, shoulder screws 330 and 332 correspondingly rise within respective slots 326 and 328. However, in consequence of the rotational movement also imparted to assembly 308, the cam surfaces of screws 330 and 332 impart a corresponding reciprocal rotational motion to drive clutch 322.

As is revealed in FIG. 5A, the upward surface of drive clutch 322 is configured having a serrated or jawlike configuration 334. This surface is urged upwardly by a spirally wound clutch spring 336 which is impressed between a spring rest 338 and the lower side of flange 324.

The serrated teeth at 334 of drive clutch 322 engage corresponding serrated teeth of an upper, driven clutch 340. Similarly, fabricably of Delrin or the like, driven clutch 340 is formed having downwardly disposed jaw teeth at 342 which selectively mesh with the teeth at jaw surface 334 and are driven thereby. Clutch portion 340 is cylindrically shaped and slidably mounted over the outward surface of clutch driver assembly 308. However, the driven clutch 340 does not move vertically while being drivable in a rotational sense by lower, drive clutch 322. The corresponding teeth at 342 and 334 for this purposes are configured for unique directional drive, operating in a ratchet sense. In the latter regard, upon the downward movement of stem 270 and clutch driver assembly 308, lower drive clutch 322 rotates to cause a ratchet-type action between teeth 334 and 342 which is permitted by the minor amount of space at 344 between the lower surface of drive clutch 322 and upper surface of spring rest 338. FIG. 5A depicts an orientation of clutch member 322 and 340 during the non-driving return rotational movement of drive clutch 322. During this rotation, driven clutch 340 as well as distributor-selector member 126 remain stationary, inter alia, in consequence of the positioning of detent ball components 142 and 144 within corresponding indentations 110 within stationary component 32.

Upper driven clutch 340 is connected to plate member 282 such that its vertical movement is restrained and the rotational movement imparted thereto from lower, drive clutch 322 is, in turn, transmitted through studs 284, 286 and 288 to driver-selector member 126. The connection between upper, driven clutch 340 and plate 282 is through a gimbal assembly. Looking to FIGS. 5, 5A and 6, the gimbal assembly is shown to comprise a gimbal ring 346 which is pivotally attached to plate 282 by two axially aligned shoulder screws 348 and 350 extending through respective tabs 352 and 354 formed upwardly from plate 282. Screws 348 and 350 are threadably engaged within ring 346 while permitting the pivotal movement thereof. Gimbal ring 346, in turn, is pivotally connected to driven clutch 340 by axially aligned pivot pins 356 and 358 (FIG. 6) which extend through ring 346 and into a slidably journaled connection within corresponding openings within upper driven clutch 340.

With the arrangement thus described, any deviation from a vertical movement of the reciprocating components of mechanism 280 is accommodated for by the gimbal assembly as well as the pivotal connection at drive nut 310. This arrangement assures that rotational movement will be imparted to drive studs 284, 286 and 288 without the occurrence of binding phenomena which would derogate from the reliability of apparatus 10.

FIG. 5 reveals that conduits for receiving tubes 256 and 258 extend through the wall of clutch driver assembly 308. These tubes then extend into the upper cavity 56 of cap 52. Cap 52 additionally incorporates such elements as an electronic timer shown generally at 360 and having a manual adjustment extending through cap 38 at 362. A fuse also is provided for the system at 364 and an exhuast vent for cavity 56 is shown in FIG. 2 at 272. The logic circuit utilized in periodically energizing the solenoid drive of valve 260 may assume a variety of configurations, one such circuit being descirbed in detail in the abovementioned application for United States patent by Roy B. Smith.

Where highly viscous lubricants such as No. 1 grease are distributed from reservoir portions 26 and 28, it has been found beneficial to impart a plowing action thereto in the vicinity of inlet openings 146 and 148. Such action may be produced by a simple wire plow component as at 370 in FIGS. 4 and 8, one end of which is fixed to the stationary pump well at 160 and which extends over one or more of the inlet opening positions as shown.

In operation, with the appropriate mounting of apparatus 10 upon a truck or the like, the reservoirs at 26 and 28 are filled with grease or other suitable lubricant, air lines as at 266 are connected with a compressed air supply and an appropriate actuation timing logic is selected at 362. Solenoid valve 260 then will selectively actuate the air cylinder at 250. Initially, such actuation will impart an up stroke to piston 166 which, as revealed at FIG. 9, fills the reservoir of the pump function 160 with lubricant through inlet openings as at 146 and 148 and the inlet port 182. The upward movement of the piston configuration 166 causes the earlier defined receiving chamber to fill with lubricant, the auxiliary piston at 194 improving the suction of this initial piston function. The simultaneous upward movement of stem 270 will cause an indexing of the distributor-selector member 126 to a next position for the delivery of lubricant through a selected one or more of the conduits 112. This indexing movement takes place by virtue of the jaw clutch assembly actuation at mechanism 280, indexing rotation being imparted through drive studs 284, 286 and 288 to distributor-selector member 126. The earlier-described detent components "seat" at the completion of movement of component 126.

Upon reaching its upward travel, the piston assembly then is driven by air cylinder drive stem 176 in an opposite, downward direction. Depending upon the position of sleeve 232 and slots 244 or 246 therein, lubricant is expressed through the meter valve outlets 224 or 236 until such time as the metering edge 192 of the piston passes them. When the output bore leading to the last encountered of the open meter valves is passed, lubricant or grease ceases to move through conduits 196 within auxiliary pump 194 and lubricant is expressed through the output port 198 of the pump assembly and through distributor conduits or bores as at 136. The downward movement of piston configuration 166 also is accompanied by a corresponding downward movement of stem 270 of air cylinder 250. This movement causes a corresponding downward rotational movement of clutch driver assembly 308 to cause drive clutch 322 to pivot in a manner wherein the teeth or serrated edges thereof at 334 disengage from teeth 342 of driven clutch 340. As indicated earlier, FIG. 5A represents such a condition. The distributor-selector component 126 as coupled through studs 284, 286 and 288 to driven clutch assembly 340 remains stationary in consequence of the earlier discussed detent action between components 126 and 32. As the sleeve 232 rotates in the course of operation of apparatus 10, slots 244 and 246 move into and out of engagement with the corresponding ball members of meter valves 222 and 220. As a consequence, varying amounts of lubricant may be distributed through predetermined ones of the outlet ports as at 106 within member 32. The interval between each actuation of cylinder 250 may be varied at the option of the operator by adjusting the control thereof at 362.

Since certain changes may be made in the above-described apparatus without departing from the scope of the invention herein involved, it is intended that all matter contained in the description thereof or shown in the accompanying drawings shall be interpreted as illustrative and not in a limiting sense.

I claim:

1. In apparatus for periodically dispensing lubricant through a plurality of conduits extending to selected sites within a mechanism, said apparatus being of a variety having a housing mountable in the vicinity of said mechanism, said housing including a reservoir for retaining a quantity of said lubricant and distributor means mounted upon said housing and having input means for receiving said lubricant and including selector means actuable to incrementally rotate about a centrally disposed axis between positions effecting a passageway communicating said input means with predetermined ones of said conduits, the improvement comprising:

a pump assembly fixedly mounted upon said housing substantially coaxially with said centrally disposed axis and including:

cylinder means defining a pump chamber having an inlet port communicating with said reservoir;

inlet check valve means for selectively opening and closing said inlet port;

a pump piston actuable to slide reciprocally within said pump chamber and having a metering edge movable therewith between first and second positions along a path spaced a predetermined distance from said inlet port and defining a receiving chamber within said pump chamber when said metering edge is at said first position;

meter valve means mounted upon said cylinder means, positioned a predetermined distance along said path from said first position, communicating between said receiving chamber and said reservoir and having open and closed orientations for selectively effecting the removal of lubricant from said receiving chamber to said reservoir when said pump piston is moved from said first toward said second position;

control means for selectively effecting the opening and closing of said meter valve means;

output valve means communicating between said pump chamber and said distributor means input means; and actuator means mounted upon said housing for selectively actuating said selector means to effect said rotation thereof and for actuating said pump piston to move from said second to said first position to load said receiving chamber with a charge of said lubricant through said inlet port and, subsequently, to move from said first to said second position to effect the expression of said lubricant selectively through said meter valve means when in an open orientation and, subsequently, through said output valve means.

2. The improved apparatus of claim 1 in which said meter valve means comprises:

a lubricant passage extending through said cylinder means and positioned a predetermined distance from said first position; and a ball member located at said lubricant passage.

3. The improved apparatus of claim 2 in which said control means comprises a sleeve extending over and rotatable about a portion of said cylinder means, rotatable in correspondence with said distributor means selector means, and configured for operative association with said ball member to define a check valve exhibiting said open and closed orientations in predetermined correspondence with the rotational position of said selector means.

4. The improved apparatus of claim 3 in which said control means sleeve is configured having a slot therein situated over said ball member when said meter valve means exhibits an open orientation, said slot having a width for retaining said ball member at said opening while permitting its movement outwardly therefrom a distance sufficient to derive said open orientation.

5. The improved apparatus of claim 4 in which said sleeve is fixed to said selector means.

6. The improved apparatus of claim 1 in which said pump piston further includes an auxiliary pump piston slidable within said pump chamber, coupled with said pump piston and spaced therefrom to be reciprocally slidable between a location adjacent said inlet check valve means and a location outward of said second position and including lubricant transmitting channel means extending therethrough for selectively conveying lubricant therethrough toward said receiving chamber when said pump piston moves from said first toward said second position.

7. The improved apparatus of claim 6 in which said lubricant transmitting channel means are configured having a cross-sectional area selected for effecting said lubricant conveyance when said lubricant is expressed through a said meter valve means having a said open orientation.

8. The improved apparatus of claim 6 in which said output valve means comprises a first groove formed about the periphery of said cylinder means at a position intermediate said inlet port and said auxiliary pump piston, a second groove formed within said first groove, a passage extending between said first and second grooves and said pump chamber a ball member located within said first and second grooves at the opening therein of said passage, and a flexible ring positioned within said second groove and over said ball member.

9. The improved apparatus of claim 6 in which said inlet check valve means is present as a ball check valve positioned substantially at the lowest level of said reservoir.

10. The improved apparatus of claim 9 in which said inlet check valve means is located below said selector means.

11. The improved apparatus of claim 1 in which said actuator means includes drive piston means reciprocally mounted within a cylinder and drivable in mutually opposite directions by the controlled introduction within and exhaustion from said cylinder of compressed gas, for deriving a drive output reciprocally movable between first and second positions 12. The improved apparatus of claim 11 in which said actuator means further comprises:

drive assembly means coupled in driven relationship with said piston means drive output for deriving a reciprocal drive output rotating a predetermined extent in a first direction in response to said drive output movement from said first to said second position and rotating an equivalent extent in a second direction in response to said drive output movement from said second to said first position;

a jaw clutch assembly coupled in driven relationship with said drive assembly means and having a driven clutch component rotationally, incrementally and unidirectionally movable a predetermined extent only in response to said drive assembly means drive output movement from said second to said first position; and drive transfer means for connecting said distributor means selector means in driven relationship with said driven clutch component.

13. The improved apparatus of claim 12 in which said drive transfer means comprises:

a gimbal assembly pivotally and slidably connected with said driven clutch component and fixed for said incremental and unidirectional rotation therewith; and connector means coupled between said gimbal assembly and said selector means for imparting rotative motion thereto from said driven clutch component.

14. The improved apparatus of claim 13 in which said connector means comprises a drive plate pivotally coupled to said gimbal assembly; and at least two elongate stud components fastened between said drive plate and said selector means.

15. The improved apparatus of claim 12 in which said drive assembly means comprises:

a cylindrically shaped clutch driver guide fixed to said actuator means;

a cylindrically shaped clutch driver slidably movable over said clutch driver guide, connected in driven relationship with said drive piston means and in driving relationship with said driven clutch component; and bearing means intermediate said clutch driver and said clutch driver guide for effecting said reciprocal drive output in response to said drive piston means drive output.

16. The improved apparatus of claim 15 in which said bearing means comprises a curvilinear race formed in said clutch driver guide, a retainer slot formed within said clutch driver and a plurality of ball members extending within both said race and said slot.

17. The improved apparatus of claim 15 in which said jaw clutch assembly further includes:

a drive clutch component slidably mounted upon said clutch driver;

spring means for urging said drive clutch into driving engagement with said driven clutch component; and said drive clutch component and said driven clutch component are configured having mutually engagable serrated edge surfaces for imparting a unidirectional drive to said driven clutch component.

* * * * *